US008135337B2

(12) United States Patent
Larsson

(10) Patent No.: US 8,135,337 B2
(45) Date of Patent: Mar. 13, 2012

(54) SCHEDULING IN A WIRELESS MULTI-HOP RELAY NETWORK

(75) Inventor: Peter Larsson, Solna (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 895 days.

(21) Appl. No.: 12/095,478

(22) PCT Filed: Nov. 29, 2005

(86) PCT No.: PCT/SE2005/001789
§ 371 (c)(1),
(2), (4) Date: May 29, 2008

(87) PCT Pub. No.: WO2007/064249
PCT Pub. Date: Jun. 7, 2007

(65) Prior Publication Data
US 2008/0274692 A1    Nov. 6, 2008

(51) Int. Cl.
*H04B 7/15* (2006.01)
(52) U.S. Cl. .......................... 455/11.1; 455/13.1; 455/16
(58) Field of Classification Search ................. 455/3.02, 455/427, 7, 11.1, 12.1, 13.1, 13.2, 16; 370/226, 370/293, 246, 274, 279, 315, 316, 492, 501
See application file for complete search history.

(56) References Cited

U.S. PATENT DOCUMENTS

| | | | | |
|---|---|---|---|---|
| 7,809,047 B2* | 10/2010 | Kummetz | .................... | 375/211 |
| 2003/0124976 A1* | 7/2003 | Tamaki et al. | .................. | 455/15 |
| 2003/0161268 A1* | 8/2003 | Larsson et al. | ................ | 370/229 |
| 2004/0192204 A1* | 9/2004 | Periyalwar et al. | ............. | 455/25 |
| 2004/0233918 A1 | 11/2004 | Larsson et al. | | |
| 2005/0141593 A1* | 6/2005 | Pasanen et al. | ............... | 375/130 |
| 2005/0254442 A1* | 11/2005 | Proctor et al. | ................ | 370/294 |
| 2005/0265387 A1* | 12/2005 | Khojastepour et al. | ....... | 370/467 |
| 2006/0023803 A1* | 2/2006 | Perlman et al. | ............... | 375/267 |

OTHER PUBLICATIONS

Larsson, P et al: Multiuser Diversity Forwarding in Multihop Packet Radio Networks: Wireless Communications and Networking Conference, 2005 IEEE, vol. 4, pp. 2188-2194, Mar. 13-17, 2005.

* cited by examiner

*Primary Examiner* — Dominic E Rego

(57) ABSTRACT

A wireless relaying network having a number of network nodes including a designated originating node, at least one relaying node, and at least two receiving nodes. The designated originating node transmits a pilot signal, and the relaying node(s) receives and forwards the pilot signal to the receiving nodes, each of which measures channel quality based on the received pilot signal. At least part of the receiving nodes feed information on the measured channel quality all the way back to the designated originating node, and the originating node then schedules data for transmission to at least one selected node of the receiving nodes based on the received channel quality information. Subsequently, the designated originating node transmits data to the selected receiving node(s) via the same relaying node(s) that forwarded the pilot signal. In this way, multi-user diversity scheduling is introduced to relaying networks that provides significant data rate enhancements.

24 Claims, 10 Drawing Sheets

SCHEDULING IN A WIRELESS MULTI-HOP RELAY NETWORK

TECHNICAL FIELD OF THE INVENTION

The present invention generally relates to wireless networks, and especially to wireless relaying networks such as cooperative relaying networks.

BACKGROUND OF THE INVENTION

Future wireless and/or cellular systems are expected, apart from many other aspects, to offer increased coverage, support higher data rates or a combination of both. In addition, the cost aspect of building and maintaining the system is expected to become even more important in the future. As data rates and/or communication distances are increased, the problem of increased battery consumption also needs to be addressed.

One aspect is rethinking the topology used in existing systems, as there has been little change of topology over the three generations of cellular networks.

For instance, it is well known that multi-hopping offers possibilities of significantly reduced path loss between communicating (relay) entities, which may benefit the user.

Another type of topology considers so called cooperative relaying. This is a research area that investigates cooperation among multiple stations. In recent research literature, it goes under several names, such as cooperative diversity, cooperative coding, virtual antenna arrays, and so forth. A good general overview of cooperative communication schemes is given in [1]. The general benefits of cooperation between stations in wireless communication can be summarized as higher data rates, reduced outage (due to various forms of diversity), increased battery lifetime and extended coverage (e.g. for cellular systems).

More recently, the idea of cooperative relaying with smarter repeaters (or relays) has received some interest. The idea is that relays can cooperate in forwarding a signal from a transmitter to a receiver [2]. A signal sent by an originating transmitting node may first be received by a number of relays that concurrently forward the signal to a receiving node. The cooperation may for instance involve aspects of coherent combining, STC (Space-Time Coding such as Alamouti diversity), and be of regenerative (decode-and-forward) or non-regenerative (amplify-and-forward) nature. In cooperative relaying, the number of hops is normally two hops, i.e. one hop to the relay station(s), and one hop to the receiving station.

The concept of cooperative relaying may in a sense be regarded as a degenerated case of multi-hopping involving only two hops, but at the same time generalized to and allowing for parallel paths as well as signal processing to be exploited. The relays are generally allowed to perform various signal processing and coding tasks that in various ways improve the overall communication performance. The benefits of the mechanisms that are exploited in cooperative relaying may broadly be divided into diversity gain, beamforming gain and spatial multiplexing gain.

Many fundamental principles have been developed for cooperative relaying schemes [1], [3], [4], and [5], each with its own benefits and drawbacks. Cooperative relaying schemes that perform well usually rely on precise channel state information, but then require fast protocols and impose additional overhead. Alternatively, the requirements on detailed knowledge of the channel are relaxed, but then the overall communication performance is generally reduced.

SUMMARY OF THE INVENTION

The present invention overcomes these and other drawbacks of the prior art arrangements.

It is a general object of the present invention to provide improved wireless communication networks.

It is also an object to provide improved scheduling in wireless networks such as wireless relaying networks.

In particular it is desirable to provide increased average data rate and reduced variance, as well as increased aggregate data rate.

It is a specific object to efficiently allocate transmit power to relay nodes in an (opportunistic) relaying network to further enhance user data rates.

It is also a specific object to be able to efficiently handle the situation of destructive interference when multiple relays are forwarding signals to a mobile terminal.

It is another specific object to provide an improved method and system for relaying information in a wireless relaying network, as well as an apparatus/network node for supporting efficient relaying in such a network.

Yet another specific object is to provide improved macro diversity operation in a wireless communication network, as well as an associated controller apparatus for connection with at least two radio base stations in such a network.

These and other objects are met by the invention as defined by the accompanying patent claims.

A first aspect of the invention relates to a wireless relaying network having a number of network nodes including a designated originating node, at least one relaying node, and at least two receiving nodes (also referred to as users). Basically, the designated originating node transmits a pilot signal, and the relaying node(s) receives and forwards the pilot signal to the receiving nodes, each of which measures channel quality based on the received pilot signal. In accordance with the invention, at least part of the receiving nodes feed information on the measured channel quality all the way back to the designated originating node, and the originating node then schedules data for transmission to at least one selected node of the receiving nodes (users) based on the received channel quality information. Subsequently, the designated originating node transmits data to the selected receiving node(s) via the same relaying node(s) that forwarded the pilot signal. In this way, multi-user diversity scheduling is introduced to relaying networks in a unique and efficient manner that provides significant data rate enhancements.

In this context, multi-user diversity scheduling allows a user experiencing a "momentary" good transmitter-relay(s)-receiver channel to be selected for communication, thereby allowing for increased average data rate and reduced variance, as well as increased aggregate data rate.

Preferably, the multi-user diversity scheduling typically involves selection of a receiving node/user among those nodes/users that have the highest channel quality, as well as selection of data associated with the selected node for transmission. The highest channel quality could be determined in a relative sense, i.e. the instantaneous channel quality relative its average channel quality, but other quality measures such as absolute channel quality may also be used. While channel dependent scheduling is a core in multiuser diversity scheduling, other aspects may also be accounted for, such as fairness among users and user Quality-of-Service requirements. Moreover, the channel quality may be based on instantaneous channel or predicted channel quality. Hence, the decision of which receiving node/user to select is based on a channel quality based metric.

The novel idea of multi-user diversity scheduling in relaying networks has turned out to be particularly advantageous for cooperative relaying networks, and cooperative relay-assisted two-hop networks.

Although it is possible to use only a single relaying node, it is beneficial to use multiple relaying nodes that, for pilot transmission, concurrently and on the same frequency transmit the pilot signal, and for data transmission, concurrently and on the same frequency transmit data. When multiple relaying nodes are forwarding signals to a receiving node, the situation of potential destructive interference at the receiving nodes is efficiently handled by the incorporation of multi-user diversity in the relaying architecture such that only receiving nodes that experience good channel quality are selected for communication.

For example, the originating node may be a base station and the receiving nodes may be mobile user terminals. The relaying nodes may generally be any relaying stations, including amplify-and-forward stations as well as decode-and-forward stations.

The present invention also offers the flexibility of power-controlled relaying nodes. In this aspect of the invention, the relay transmit power is preferably allocated based on the average link quality of the link between relay nodes and a selected set of receiving nodes. In the case of amplify-and-forward relaying, for example, the relay transmit power may also be allocated based on the average link quality of the link between the originating node and the relay nodes.

In another aspect of the invention, multi-user diversity scheduling is used in a relaying network based on OFDM (Orthogonal Frequency Division Multiplexing) or OFDMA (Orthogonal Frequency Division Multiple Access) together with a mechanism that enables the direct signal from the originating node and the relayed signal to be received concurrently at the receiving nodes to provide for constructive interference of the direct and relayed signals. This is preferably accomplished by suitable configuration of the originating transmitting node and the relays. For example, the relaying nodes may be on-frequency repeating relay stations, each of which receives the signal and with a latency substantially smaller than the OFDM (Orthogonal Frequency Division Multiplexing) symbol duration forwards the signal in the same frequency band. The originating transmitting node may be configured with a cyclic prefix duration adapted to the power delay profile of the equivalent channel of the relayed signal and the direct signal to ensure concurrent reception and constructive interference.

For the case when the originating transmitting node and at least one of the receiving nodes are equipped with multiple antennas and a MIMO/MISO-based opportunistic communication scheme is used, at least part of the relaying nodes may be equipped with one or multiple antennas, and one of the receiving nodes may be selected for MIMO/MISO based communication to create a richer channel, i.e. a channel that will increase the overall end-to-end (ETE) channel capacity even further. In particular, spatial multiplexing based MIMO may be used to offer high spectral efficiency. The feedback for this scheme is preferably a vector of channel qualities describing the quality of each MIMO sub-channel.

In yet another aspect of the invention, multi-user diversity is introduced for improving macro diversity in a wireless communication network in a unique way. The wireless network basically comprises a controller, at least two base stations in connection with the controller, and two or more mobile terminals. The base stations transmit a pilot signal, and each mobile terminal receiving the pilot signal measures the channel quality. Each mobile terminal then feeds back information on the measured channel quality all the way to the controller, which schedules data for transmission to a selected one of the mobile terminals based on received channel quality information. Finally data is transmitted to the selected mobile terminal by the base stations.

The invention offers the following advantages:
Improved relaying performance.
Enhanced data rates.
Power-controlled relaying nodes.
Constructive interference of direct and relayed signals.
Potential MIMO and/or MISO operation for further enhancement.
Improved macro diversity operation.

Other advantages offered by the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS OF THE INVENTION

Figure 1:
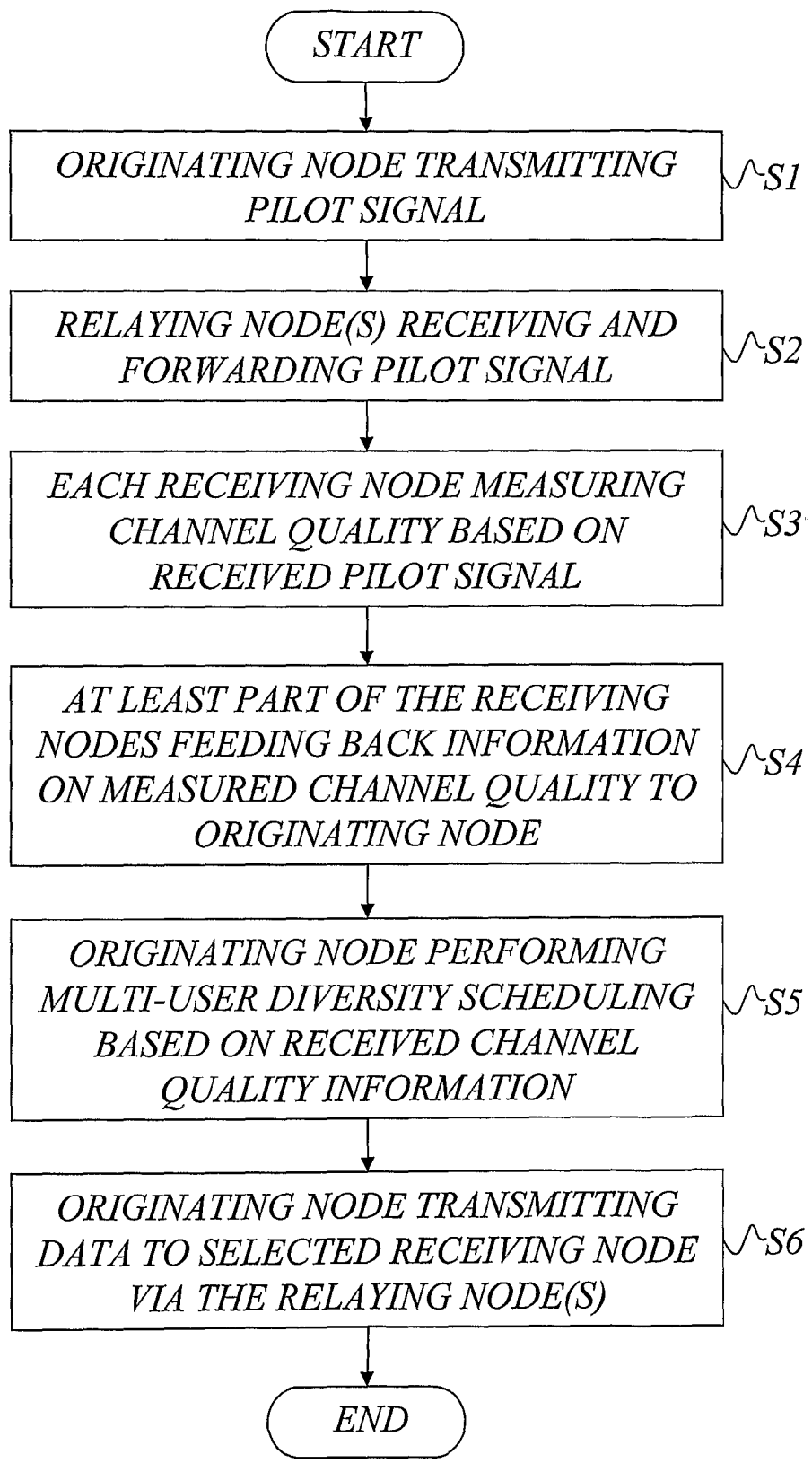
FIG. 1 is a schematic flow diagram illustrating an exemplary preferred embodiment of the invention.

Throughout the drawings, the same reference characters will be used for corresponding or similar elements.

A basic idea according to the invention is introduce multi-user diversity scheduling to relaying networks in a unique and efficient manner that provides significant data rate enhancements.

FIG. 1 is a schematic flow diagram illustrating an exemplary preferred embodiment of the invention. In step S1, a designated originating node transmits a pilot signal. In step S2, one or more relaying nodes, also simply referred to as relays, receives and forwards the pilot signal to a number of receiving nodes (users). In step S3, each receiving node measures the channel quality in response to the received pilot signal. Next, in step S4, at least part of the receiving nodes report the measured channel quality back to the designated originating node. This provides channel quality feedback from the receiving nodes to the originating node. In step S5, the originating node performs multi-user diversity scheduling based on the received channel quality information for selecting to which (one) of the multiple receiving nodes (users) data should be transmitted. Subsequently, in step S6, the originating node transmits data to the selected receiving node(s) via the same relaying node(s) that transmitted the pilot signal. This means that out of the various users that receive the pilot signal a specific user experiencing a "momentary" good transmitter-relay-receiver channel can be selected for communication, thereby allowing for increased average data rate and reduced variance, as well as increased aggregate data rate. Preferably, the multi-user diversity scheduling involves selection of a user among those users that have the highest channel quality, as well as selection of data associated with the selected node for transmission.

Although the present invention is generally applicable in wireless relaying networks, it has turned out to be particularly advantageous for cooperative relaying networks, and especially cooperative relay-assisted two-hop networks.

Figure 2:
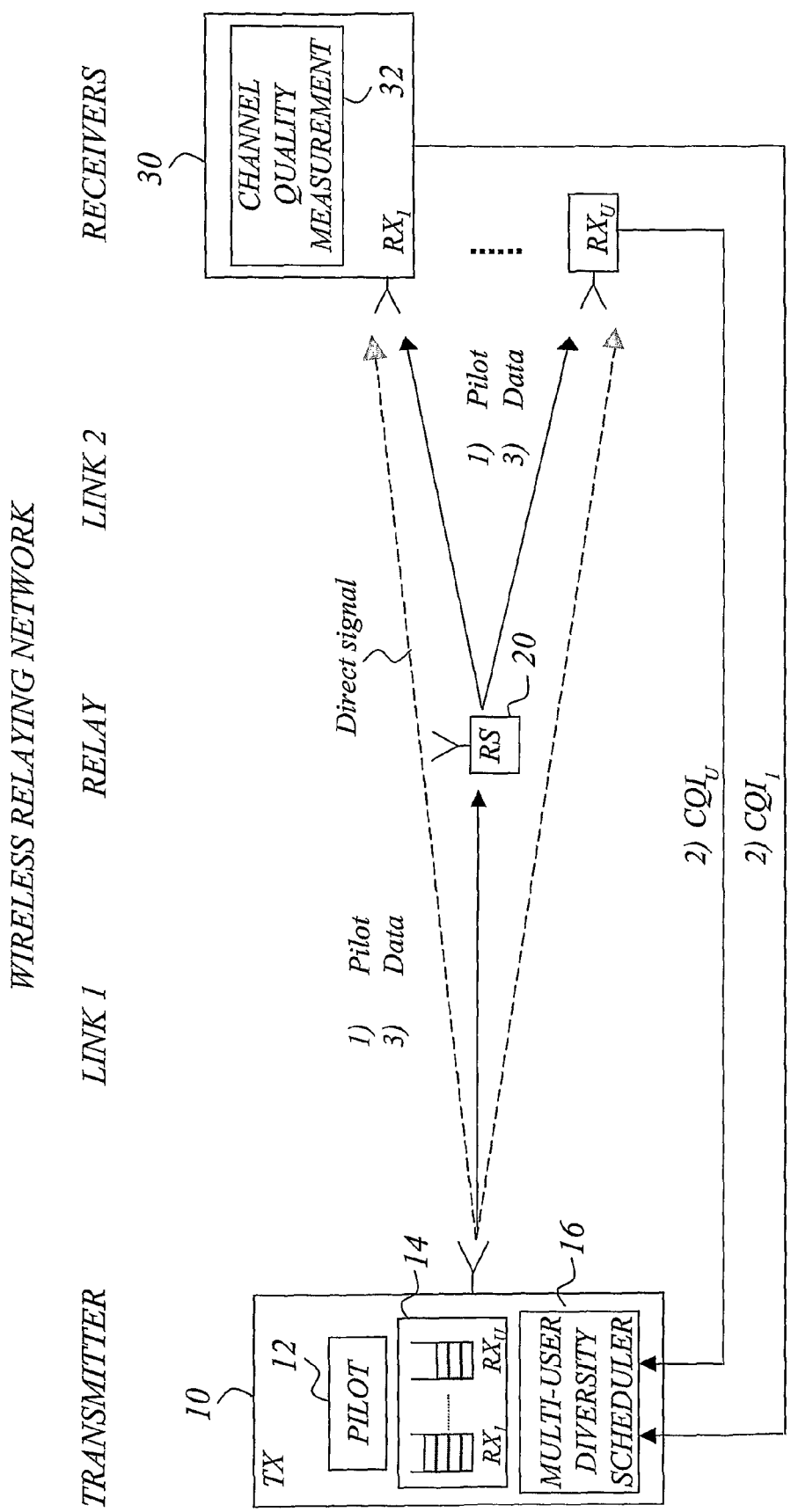
FIG. 2 is a schematic diagram of a multi-user diversity based wireless cooperative relaying network according to an exemplary preferred embodiment of the invention.

FIG. 2 is a schematic diagram of a multi-user diversity based wireless cooperative relaying network according to an exemplary preferred embodiment of the invention. The wireless cooperative relaying network basically comprises a designated originating node, also referred to as a transmitter (TX) 10, a relaying node or so-called relay station (RS) 20, and a number, U, of receiving nodes, simply referred to as receivers $(RX_1, \ldots RX_U)$ 30. The transmitter 10 comprises a pilot module 12, a data queue 14 for storing data destined for the receivers $(RX_1, \ldots, RX_U)$, and a multi-user diversity scheduler 16, in addition to the normal transceiver functionality. The relay station 20 may be any conventional relay station, amplify-and-forward or optionally decode-and-forward. In addition to the normal transceiver functionality, each of the considered receivers 30 comprises a channel quality measurement unit 32.

The originating node may for example be a base station and the receiving nodes may be mobile user terminals. The relaying node may generally be any relaying station such as an amplify-and-forward station or a decode-and-forward station.

Initially, a pilot is sent (1) from the transmitter 10 via the relay station 20 to the receivers 30. The channel quality is measured by the channel quality measurement unit 32 in each of the receivers 30 and reported (2) to the originating transmitter 30. Next, the transmitter 30 employs the multi-user diversity scheduler 16 for scheduling to which one of the receivers 30 it is desirable to transmit (and hence what to transmit) at least partially based on CQI (Channel Quality Information) feedback from at least part of the receivers 30. The scheduler 16 will normally prioritize receivers reporting high CQI values so as to optimize the data rate. Finally, the transmitter 10 selects data associated with the selected receiver from the data queue 14, and transmits (3) the data using an appropriate modulation and coding scheme adapted according to the CQI of the selected receiver. Normally, both pilot and data traverse the same path, and it is assumed that the channel remains substantially the same from the measurement to the data transmission. In other words, the measurement-to-data-transmission cycle is normally shorter than or at most of the same order as the channel coherence time and the transmit powers of the transmitter 10 and relay station 20 are substantially the same or merely slowly changing between the measurement-to-data-transmission cycle. Since relaying is used, i.e. the equivalent of introducing a larger frequency reuse distance, the impact of potentially unpredictable 'inter-cell interference' is reduced.

In many cooperative relaying schemes, the benefits of exploiting both the relayed signal(s) as well as the direct signal (indicated by dotted lines) from the transmitter have been recognized. The approach is typically that the direct signal and the relayed signal, being received at two different time instances, are combined in the receiver. The present invention is of course also applicable to this kind of cooperative relaying schemes.

It is also envisaged that in accordance with the invention measures can be taken in a wireless relaying network based on OFDM (Orthogonal Frequency Division Multiplexing) or OFDMA (Orthogonal Frequency Division Multiple Access) so as to enable the relayed signal and the direct signal to be received concurrently at the receiving side to provide for constructive interference of the relayed signal and the direct signal. This aspect of the invention will be described in detail later on.

In general, the design impact on mobile user terminals (receiving nodes) and the base station (transmitting node) is minor if opportunistic scheduling is already deployed in a single hop system. The difference is that the base station—user terminals protocol design needs to cater for the two-phase delay.

Multiple Relays

It is often beneficial to use multiple relaying nodes that concurrently transmit the relevant signals. Preferably, for pilot transmission, the relaying nodes concurrently and on the same frequency transmit the pilot signal, and for data transmission, concurrently and on the same frequency transmit data. When multiple relaying nodes are forwarding signals, the situation of potential destructive interference at the receiving side can be efficiently handled by the incorporation of multi-user diversity in the relaying architecture such that only a receiver that experience good channel quality is selected for communication. Moreover, the receiver experiencing a good channel quality is likely of experiencing signals from multiple relays that add coherently, which means that a beam-forming gain will be experienced in addition to the multiuser diversity gain.

Figure 3:
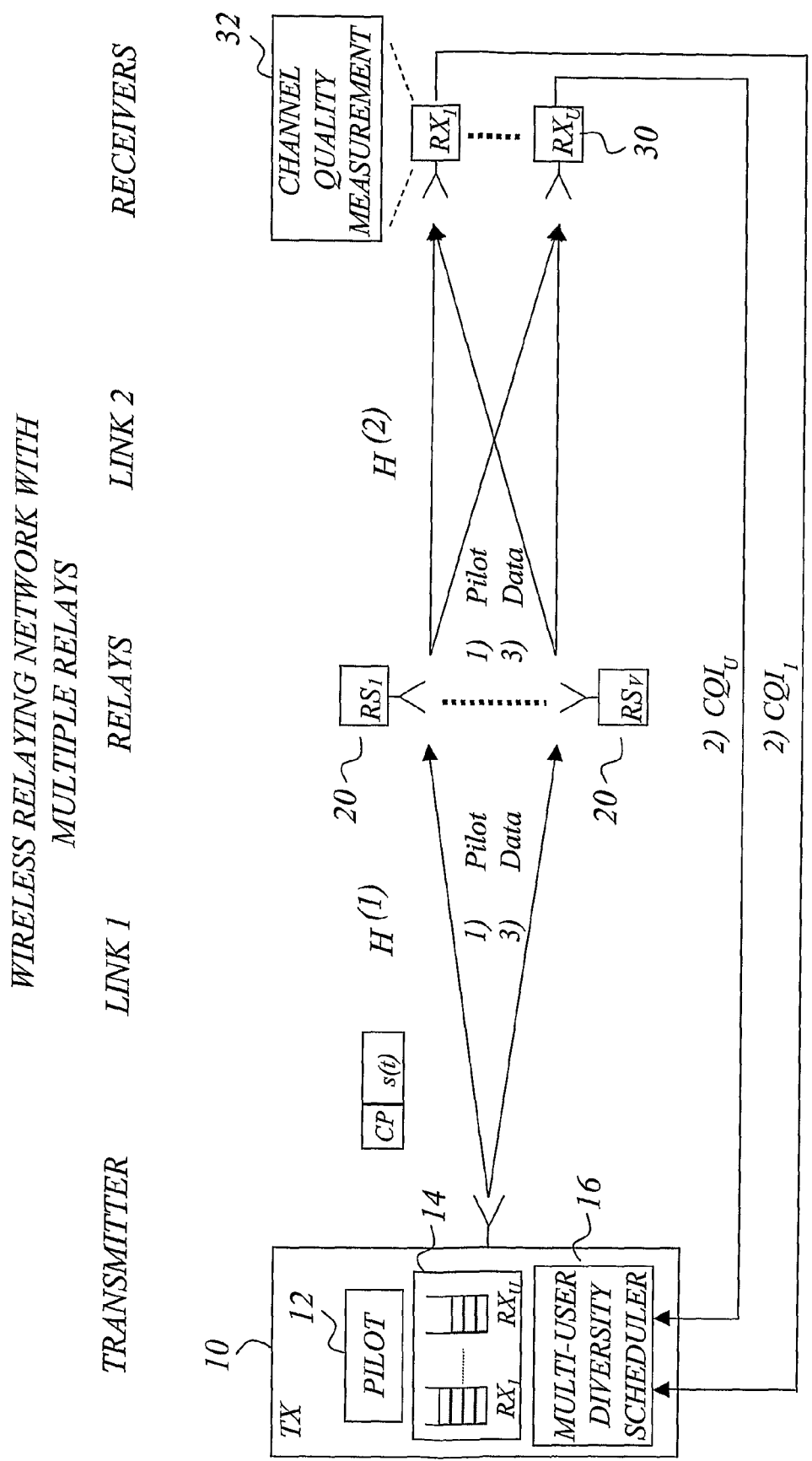
FIG. 3 is a schematic diagram of a multi-user diversity based wireless cooperative relaying network with multiple relays according to an exemplary preferred embodiment of the invention.

FIG. 3 is a schematic diagram of a multi-user diversity based wireless cooperative relaying network with multiple relays according to an exemplary preferred embodiment of the invention. It is assumed that there are U receivers and V relays, and that amplify-and-forwarding and/or decode-and-forwarding may be used.

For simplicity of notation, OFDM or OFDMA is assumed by way of example. CP denotes Cyclic Prefix, s(t) is a time-continuous signal and s(in) is a corresponding time sampled signal with sample index n.

The signal for subcarrier k received by each receiving station u under the assumption of amplify-and-forward relaying can be written as:

$$R_u(k) = \sum_{v=1}^{V} H_{u,v}^{(2)}(k) \cdot a_v(k) \cdot (H_v^{(1)}(k) \cdot S(k) + W_v(k)) + W_u(k) \quad (1)$$

or equivalently:

$$R_u(k) = S(k) \cdot H_u^{(eff)}(k) + W_u^{(eff)}(k) \quad (1a)$$

with:

$$H_u^{(eff)}(k) = \sum_{v=1}^{V} H_{u,v}^{(2)}(k) \cdot a_v(k) \cdot H_v^{(1)}(k) \quad (1b)$$

$$W_u^{(eff)}(k) = \sum_{v=1}^{V} H_{u,v}^{(2)}(k) \cdot a_v(k) \cdot W_v(k) + W_u(k) \quad (1c)$$

where v is the relay station, and H(k) is the complex channel gain, S(k) is the complex valued data symbol (e.g. selected from a signal constellation point such as in 16-QAM, PSK or similar), W(k) is the complex valued noise, $a_v(k)$ is an amplitude gain factor of a relay (could also be complex), and where (1) and (2) in the formulas above denote the transmitter to relay link, and the relay to receiver link respectively. It is also possible to include a direct link (between the transmitter to the receiver) into the equations if desired. However, for simplicity and clarity, the direct link is not included in the equations above. This case will be treated separately later on.

From equation (1b), it is clear that some subcarriers will constructively interfere with each other. Hence, a user may use a subset of subcarrier resources, whereas another user uses another subset.

The gain factors $a_v(k)$ may be varying slowly over time or kept constant all the time during the measurement and data phase, i.e. the end-to-end (ETE) channel may not change significantly from CQI measurement to data transmission. It may also be set differently for different subcarriers k. Moreover, the power that the transmitter is using may be varying slowly over time or kept constant all the time during the measurement and data phase. However, if the controller decide to communicate with another set of users, the gain factors $a_v(k)$ and transmitter transmit power could change abruptly.

In reference [5], for example, scheduling is performed to determine which transmitter-receiver pair that should be active while each pair is allowed to use a pool of relays also common to other transmitter-receiver pairs. This is a clear difference compared to the invention. It can especially be noted that reference [5] considers a different topology, a set of transmitter-receiver pairs, whereas the invention considers a transmitting node potentially selecting one out of many receiving nodes. The invention is particularly applicable to the downlink in a cellular system, while [5] is more applicable in an ad hoc scenario.

Power Controlled Relays

The present invention also offers the flexibility of power-controlled relaying nodes, as will be explained below. In this aspect of the invention, the relay transmit power is preferably allocated based on the average link quality of the link between relay nodes and receiving nodes. In the case of amplify-and-forward relaying, for example, the relay transmit power may also be allocated based on the average link quality of the link between the originating node and the relay nodes.

The idea is here to, but not limited to, control relay transmit power to a group of "clustered" users, experiencing roughly the same path loss to all relays. The power setting for each relay is preferably determined based on average channel gain to noise ratio characteristics. This allows energy efficient low rate feedback for controlling transmit power since average channel quality is considered, i.e. there is no need to follow fast fading.

For example, it is normally assumed that an aggregate power constraint $P_{RS}$ exists for the relays, and the power should then be distributed among the considered relays. It is also normally assumed that receivers involved in the power control all experience roughly the same magnitude order of path loss to the relays.

In references [3-4], the optimum power allocation was derived for a coherent combining based system that allows gain and phase parameters to be tuned to instantaneous channel states. In an opportunistic cooperative relaying scheme of the invention, this knowledge cannot be assumed. However, the inventor has recognized that the average link quality can be used. In [3-4], a type of amplification parameter $b_v$ is derived that offers the optimum SNR. In contrast to [3-4], the present invention proposes to define $b_v$ in an average sense.

For amplify-and-forward type of relaying, the amplification parameter $b_v$ is defined as:

$$\bar{b}_v^{(AF)} = \sqrt{\frac{\bar{\Gamma}_{RS,v} \cdot \bar{\Gamma}_{MS,v}}{\bar{\Gamma}_{RS,v} + \bar{\Gamma}_{MS,v} + 1}} \quad (2a)$$

$\bar{\Gamma}_{RS,v} = \bar{G}_{1,v} P_{BS}/\sigma_{RS}^2$ is the average SNR experienced at relay v (which depends on the average path loss from the transmitter to the relay station, the power of the transmitter, and the noise plus interference level at the relay station). $\bar{\Gamma}_{MS,v} = \bar{G}_{2,v} P_{RS}/\sigma_{MS}^2$ may be regarded as an average virtual SNR experienced at the cluster of receivers if a relay v was allocated all relay power. This average virtual SNR depends on the path loss from the relay station to the receiver, the aggregate power constraint of the relay station, and the noise plus interference level at the receiver.

For decode-and-forward type of relaying, the amplification parameter $b_v$ is defined as:

$$\bar{b}_v^{(DF)} = \sqrt{\bar{\Gamma}_{MS,v}} \quad (2b)$$

If it is desirable to limit interference distribution, one may select a subset of relays expected to offer the highest contribution to the overall average SNR enhancement. For example, two "good" relays may be selected. The selection mechanisms and criteria proposed in [3-4] may be used, but based on average channel gain instead of instantaneous channel gain.

Figure 4:
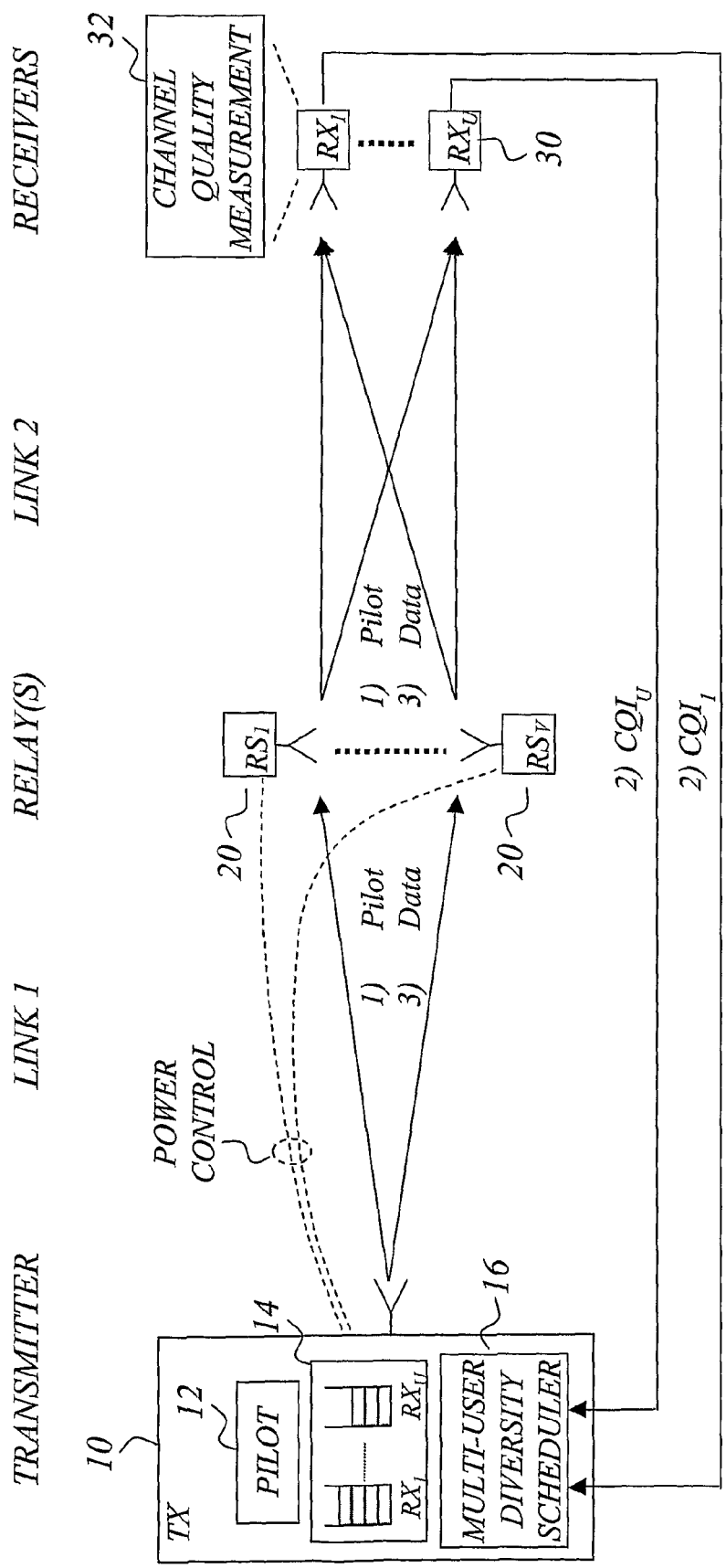
FIG. 4 is a schematic diagram of a multi-user diversity based wireless cooperative relaying network with power controlled relay(s) according to an exemplary preferred embodiment of the invention.

For an application with many receivers such as mobile stations, a reasonable power control realization is to let the power control determination take place in the transmitter such as a base station, as illustrated in FIG. 4. The power control should preferably be "aimed" at a group of receivers that experience similar propagation conditions. Of course, it is possible to use any other node for the power control calculations. It is also possible to provide a distributed solution according to the implementations described in references [6-7], but using average channel gain instead of instantaneous channel gain.

While the power control scheme above targets a group experiencing similar average propagation conditions, transmit powers of the relays (as well as the transmitter) may be adjusted to users or set of user experiencing dissimilar average propagation conditions.

The performance will be now assessed below with the proposed power allocation as well as with equal power allocation.

Performance Example

Figure 5:
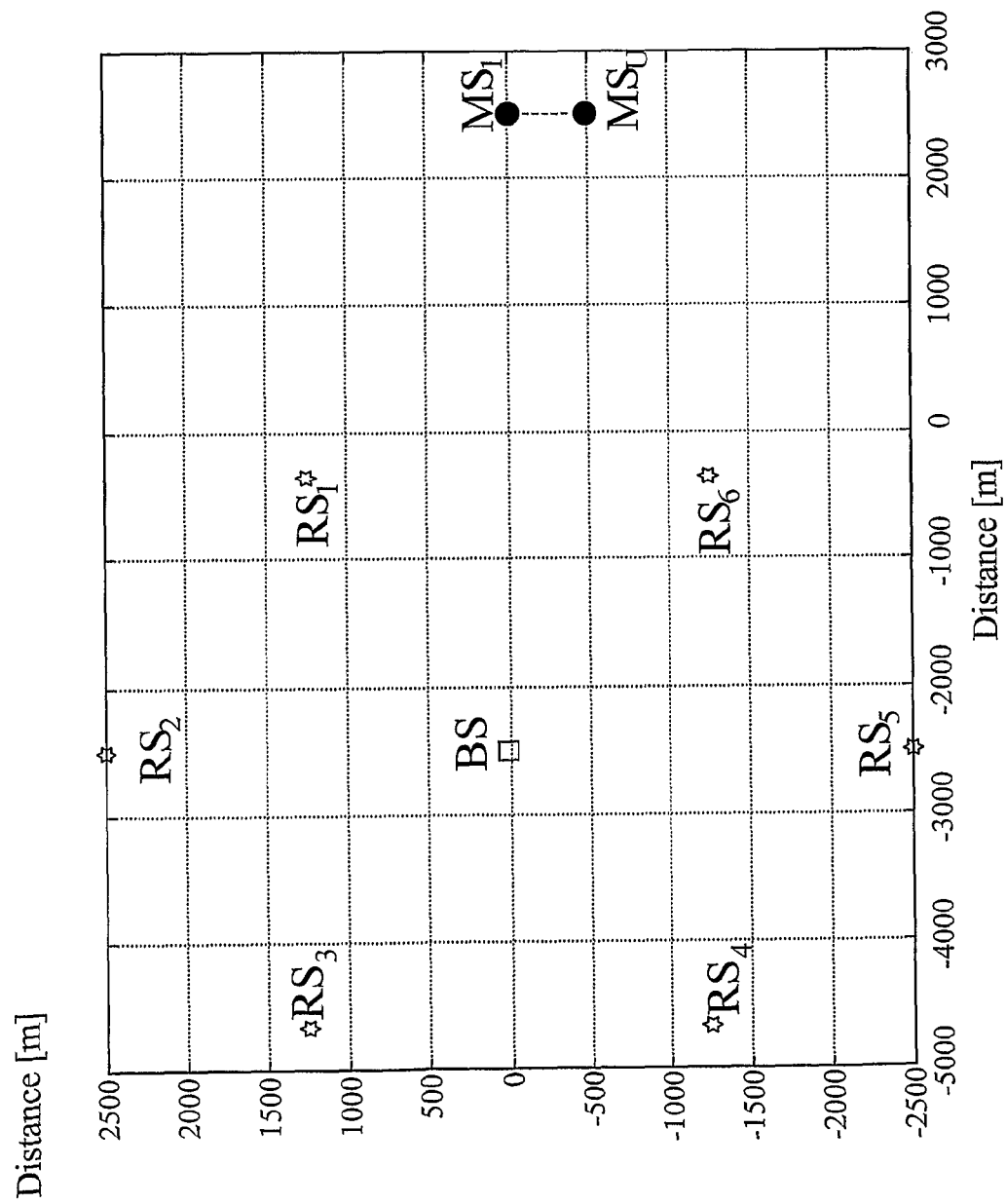
FIG. 5 is a schematic diagram illustrating an exemplary configuration of a base station and a number of relay stations for communication with a number of mobile stations.

In the following example, it is assumed that V=6 relays ($RS_1$-$RS_6$) are placed in a hexagon around an originating transmitter such as a base station (BS), and that U receivers such as mobile stations ($MS_1$-$MS_U$) are positioned a distance away from the transmitter that is roughly twice the transmitter-relay distance. The basic configuration is shown in FIG. 5.

First, amplify and forwarding will be assumed. Starting from the signal to noise ratio in a receiver as presented in [6], this relation is modified for opportunistic cooperative relaying by incorporating a random phase factor $\exp(i\phi_{v,u})$ for each relay (RS) v and each receiver (MS) u. The effective SNR for a receiver (mobile station) u is then expressed as:

$$\Gamma_{\mathit{Eff},u} = \frac{\left|\sum_{n=1}^{N}|\bar{b}_v^{(AF)}|\sqrt{\frac{\Gamma_{RS,v}\cdot\Gamma_{MS,u,v}}{\Gamma_{RS,v}+\Gamma_{MSu,k}+1}}\cdot e^{j\varphi_{u,v}}\right|^2}{\sum_{n=1}^{N}|\bar{b}_v^{(AF)}|^2} \quad (3a)$$

Note that the arguments in the square root of (3a) are instantaneous values, reflecting current and instantaneous channel conditions, in contrast to the average values used for $b_v$.

In the decode-and-forward case, the effective SNR can be written as:

$$\Gamma_{\mathit{Eff},u} = \frac{\left|\sum_{n=1}^{N}|\bar{b}_v^{(DF)}|\sqrt{\Gamma_{MS,u,v}}\cdot e^{j\varphi_{u,v}}\right|^2}{\sum_{n=1}^{N}|\bar{b}_v^{(DF)}|^2} \quad (3b)$$

For example, a greedy opportunistic algorithm may select the mobile station u having the largest effective SNR, i.e.

$$\Gamma_{\mathit{Eff}}^{(max)} = \max\{\Gamma_{\mathit{Eff},1}, \Gamma_{\mathit{Eff},2}, \ldots \Gamma_{\mathit{Eff},U}\} \quad (4a)$$

or if the average channel quality differs slightly $$\frac{\Gamma_{\mathit{Eff}}^{(max)}}{\bar{\Gamma}_{\mathit{Eff}}^{(max)}} = \max\left\{\frac{\Gamma_{\mathit{Eff},1}}{\bar{\Gamma}_{\mathit{Eff},1}}, \frac{\Gamma_{\mathit{Eff},2}}{\bar{\Gamma}_{\mathit{Eff},2}}, \ldots, \frac{\Gamma_{\mathit{Eff},U}}{\bar{\Gamma}_{\mathit{Eff},U}}\right\} \quad (4b)$$

The average rate performance $\bar{R}$ may then be determined based on the Shannon capacity. Here, it is assumed that two slots are required, the relays receive and then the relays transmit. While this may be true for a transmitter-receiver pair, it is pessimistic in the sense that a base station may alternate and transmit to another set of relays and cluster of receivers every second slot. Hence, the ½ factor could potentially also be removed.

$$\bar{R} = \frac{1}{2}E\{\log_2(1+\Gamma_{\mathit{Eff}}^{(max)})\}. \quad (5)$$

Figure 6:
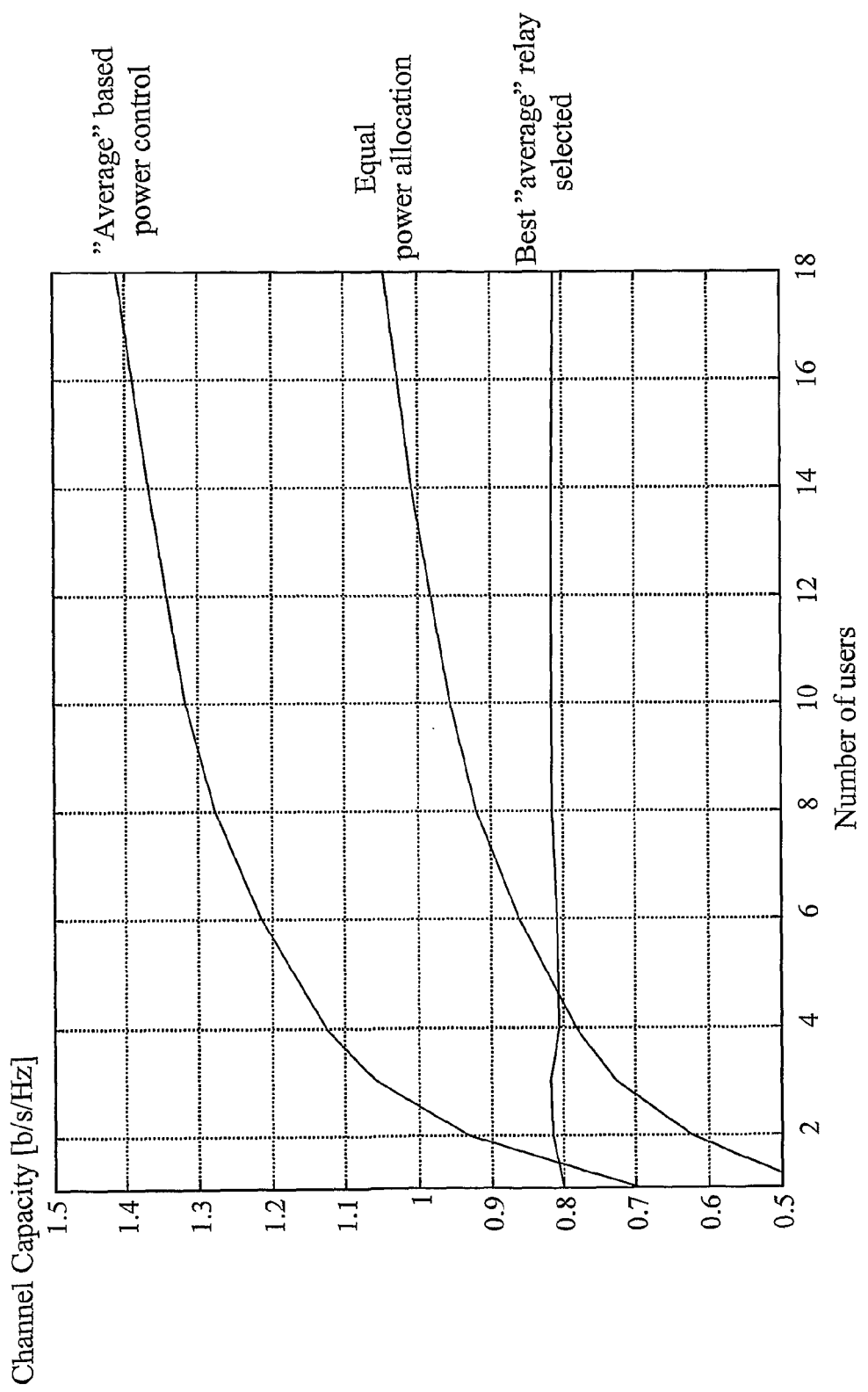
FIG. 6 is a schematic diagram illustrating the channel capacity as a function of the number of users for three different scenarios, all based on amplify-and-forward relaying.
Figure 7:
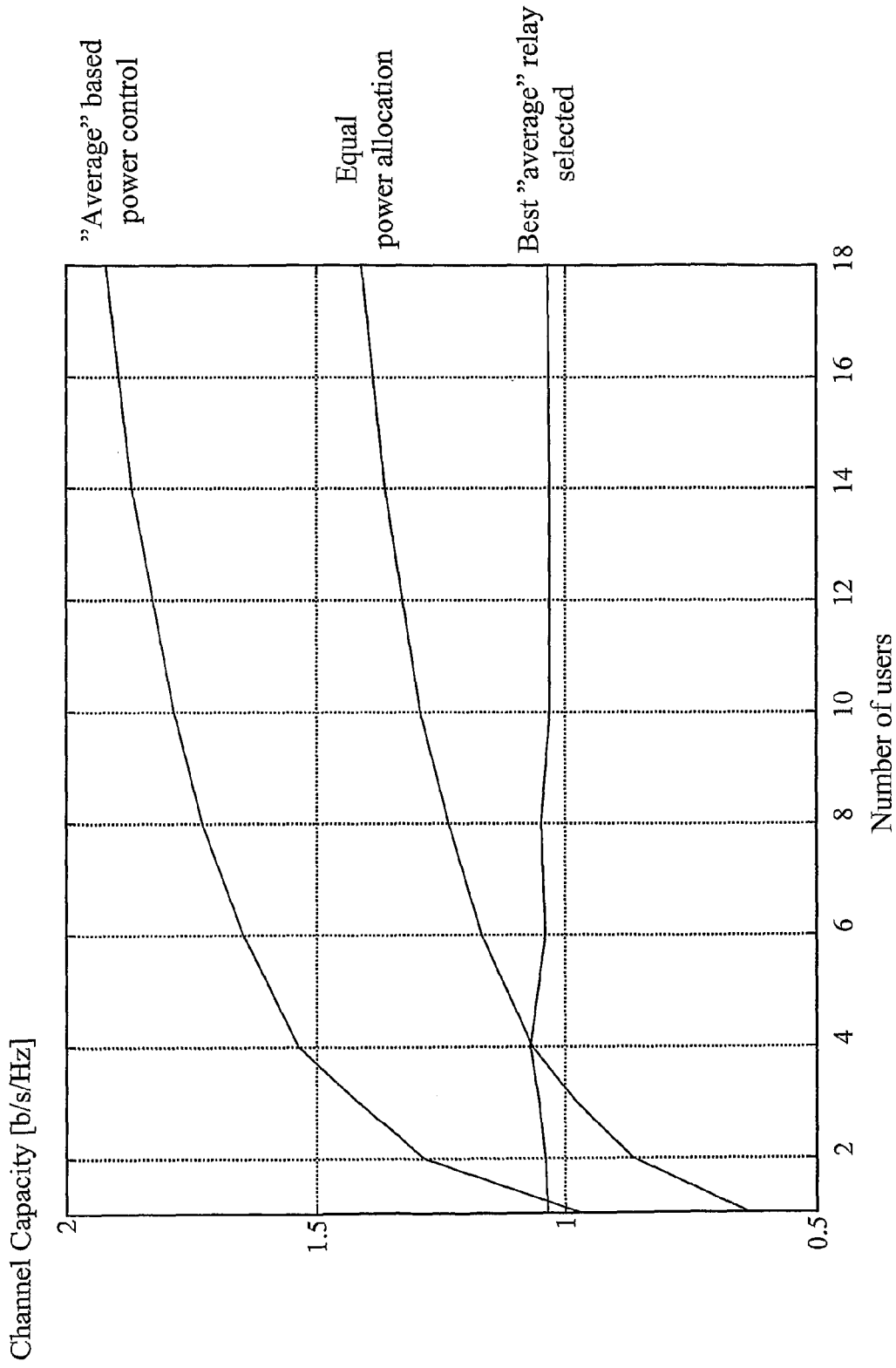
FIG. 7 is a schematic diagram illustrating the channel capacity as a function of the number of users for three different scenarios, all based on decode-and-forward relaying.

Performance is primarily evaluated for amplify-and-forward based on an inverse power loss channel with α=3.5, and Rayleigh fading on the relay-to-receiver link. The power is split equal between the transmitter (base station) and the relays, i.e $P_{BS}=P_{RS}$, and arbitrarily set such that rates are of the order 1 b/s/Hz (i.e. useful rates). For the configuration shown in FIG. 5, the result based on equations (2a), (3a), (4) is shown in FIG. 6 as the "average" based power control curve showing average rate versus the number U of mobile users. An equal power allocation curve is also shown in FIG. 6, where $b_v \approx$ constant. A third curve is also shown in FIG. 6, assuming that the relay that is best in an average sense is always selected and allocated all power $P_{RS}$. It is noted that the proposed scheme offers enhanced performance, especially when the number of mobiles to select from is more than 2. The power allocation based on average link qualities enhances the user data rate when compared to an equal power allocation strategy or the case when all power is allocated to one relay node. The same types of plots are presented in FIG. 7 for decode-and-forward relaying. Similar types and trends of gains can be seen.

Constructive Interference of Concurrently Received Direct and Relayed Signals

In a particular exemplary embodiment of the invention, multi-user diversity scheduling is used in a relaying network based on OFDM or OFDMA (Orthogonal Frequency Division Multiple Access) together with a mechanism that enables the direct signal from the originating node and the relayed signal to be received concurrently at the receiving nodes to provide for constructive interference of the direct and relayed signals. In both OFDM and OFDMA data is modulated onto multiple orthogonal sub-carriers that are sent concurrently. In OFDM, data is normally sent to one user, whereas multiple users can receive data during one OFDM symbol in OFDMA.

Basically, considering an OFDM-symbol, the symbol is formed and transmitted to at least one relaying node and also directly to the receiving nodes in such a manner as to enable the relayed signal and the direct signal to reach the receiving nodes or a cluster of selected nodes at the same time, or at least close enough in time to enable constructive interference of the OFDM symbol. Advantageously, the extracted OFDM symbol is thus substantially free from Inter Symbol Interference.

Figure 8:
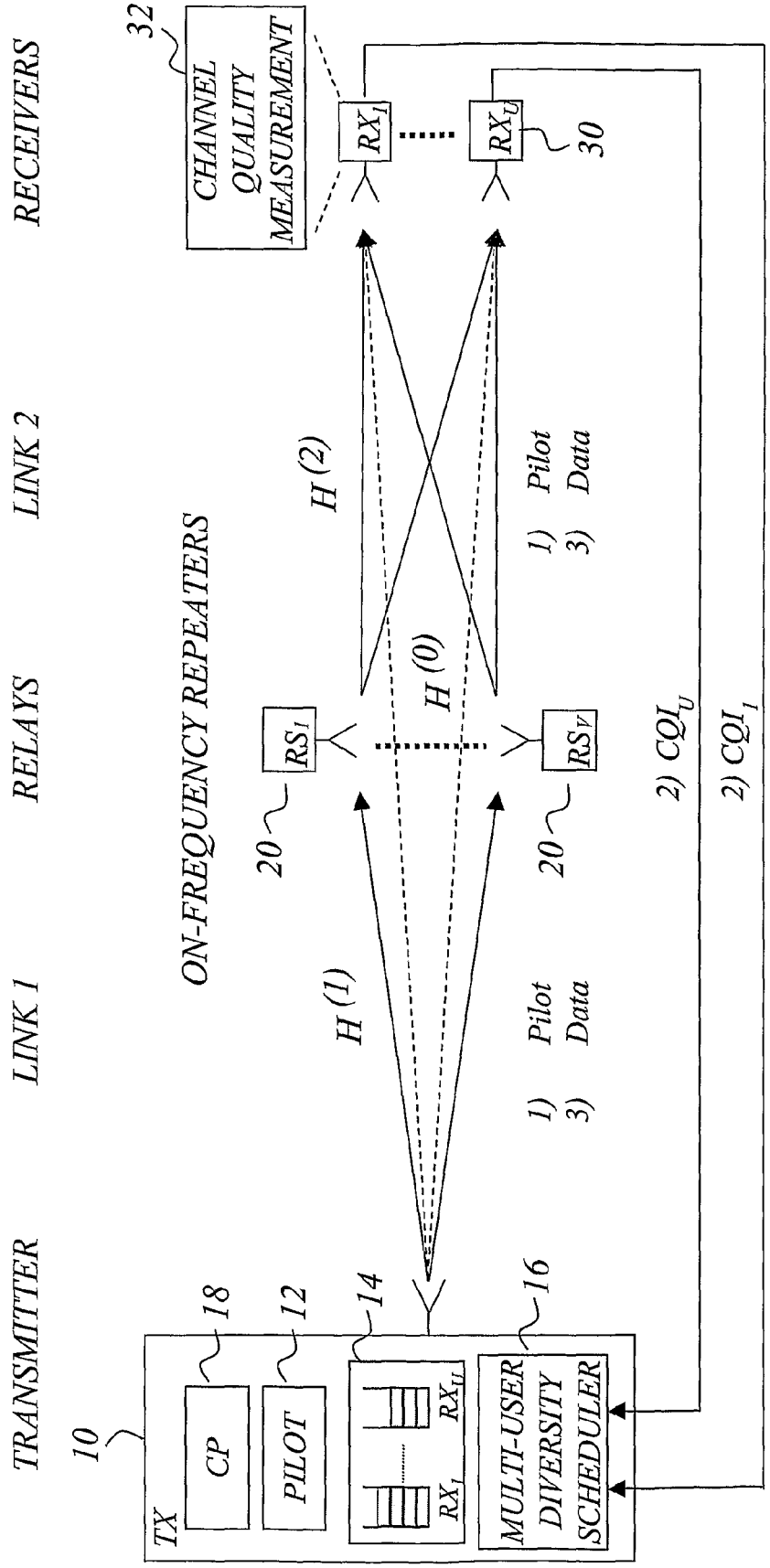
FIG. 8 is a schematic diagram of a multi-user diversity based wireless cooperative relaying network with concurrent reception of the direct and relayed signals according to an exemplary preferred embodiment of the invention.

With reference to the schematic exemplary diagram of FIG. 8, this is preferably accomplished by suitable configuration of the originating transmitting node 10 and the relaying nodes 20. For example, the relaying nodes 20 may be on-frequency repeating relays, each of which receives the signal and with a latency substantially smaller than the OFDM (Orthogonal Frequency Division Multiplexing) symbol duration forwards the signal in the same frequency band. The originating transmitting node 10 may be configured with a cyclic prefix duration adapted to the power delay profile of the equivalent channel of the relayed signal and the direct signal to ensure concurrent reception and constructive interference. The cyclic prefix may be configured in a cyclic prefix module 18 of the originating node 10.

The forming of an OFDM symbol normally involves IFFT (Inverse Fast Fourier Transform) processing, insertion of a guard interval of cyclic prefix and finally transformation of the formed OFDM symbol to a radio frequency signal before transmitting it. Correspondingly, the transmitted signal is received on the receiving side, and the radio signal is converted into the OFDM symbol, the cyclic prefix is removed and the signal is FFT processed to retrieve the actual information.

Incorporation of so-called on-frequency repeating relays, i.e. relays that can receive and transmit at the same time, is known for WCDMA systems but not for OFDMA systems. However, a fairly large relay gain is needed to make this idea useful. Modern on-frequency repeaters (e.g. those from Andrews Corp.) can have up to 95 dB gain, yet canceling its own transmitted interference through use of signal-processing techniques (apart from separated antennas). The signal processing incurs a delay, and current on-frequency repeater systems do not allow for constructive interference of direct and relayed signal(s) as the symbol time is much shorter than relay-induced delay differences. This can be solved by incorporation of cyclic prefix based OFDM where the cyclic prefix duration is assigned such that it absorbs the latency of the on-frequency repeating relays, the path delay due to the signal route via the relays, as well as multipath propagations.

In this particular example, it is assumed that at least one of the V relays 20 is an on-frequency repeater that receives the signal and transmits it immediately on the same frequency while receiving, yet imposing a delay $T_{RS}$. The delay may be due to filtering, amplification and due to self-interference cancellation, i.e. canceling its own amplified signal from its received signal of interest. The cyclic prefix (CP) duration is set roughly to $T_{CP} > T_{RS} + T_{DS} + T_P$, where $T_{DS}$ is the max delay spread per path, $T_P$ is the max path delay differences between the relay path(s) and the direct path. This setting of the CP duration in conjunction with use of OFDM ensures that OFDM symbols received by any receiver within a desired coverage area can extract an (for all practical purposes) Inter Symbol Interference (ISI) free representation of the OFDM signal. It is noted that the OFDM symbols traversing the different paths, i.e. the direct and relay path, are received concurrently with (sufficiently large) overlapping portions corresponding to the same OFDM symbol.

With account not only to the transmitter to relay link (1), and the relay to receiver link (2) but also to a direct signal, denoted by (0) in the formulas below, the signal for subcarrier k received by each receiving station u under the assumption of amplify-and-forward relaying can be written as:

$$R_u(k) = \qquad (6)$$
$$H^{(0)}(k) \cdot S(k) + \sum_{v=1}^{V} H_{u,v}^{(2)}(k) \cdot a_v(k) \cdot (H_v^{(1)}(k) \cdot S(k) + W_v(k)) + W_u(k)$$

or equivalently:

$$R_u(k) = S(k) \cdot H_u^{(\mathit{eff})}(k) + W_u^{(\mathit{eff})}(k) \qquad \text{(6a) with:}$$

$$H_u^{(\mathit{eff})}(k) = H^{(0)}(k) + \sum_{v=1}^{V} H_{u,v}^{(2)}(k) \cdot a_v(k) \cdot H_v^{(1)}(k) \qquad (6b)$$

$$W_u^{(\mathit{eff})}(k) = \sum_{v=1}^{V} H_{u,v}^{(2)}(k) \cdot a_v(k) \cdot W_v(k) + W_u(k) \qquad (6c)$$

It can be noted that ISI adjacent OFDM symbols are not involved and do not have to be included in the model above. The term Inter Symbol Interference (ISI) refers to interference between adjacent OFDM symbols.

It should also be noted that the constructive interference of the concurrently received signals is only possible if the two signals are in-phase. If the two signals are of opposite phase, the concurrent reception will result in canceling out of the OFDM-symbol. Therefore, the present invention basically supplies the necessary tools for enabling but not necessarily guaranteeing constructive interference. However, an additional optional feature of the invention would be to compare the phase of the relayed signal and the direct signal and phase shifting one of them if necessary, thereby ensuring constructive interference.

MIMO/MISO Operation in Multi-User Diversity Based Wireless Relaying Network

Figure 9:
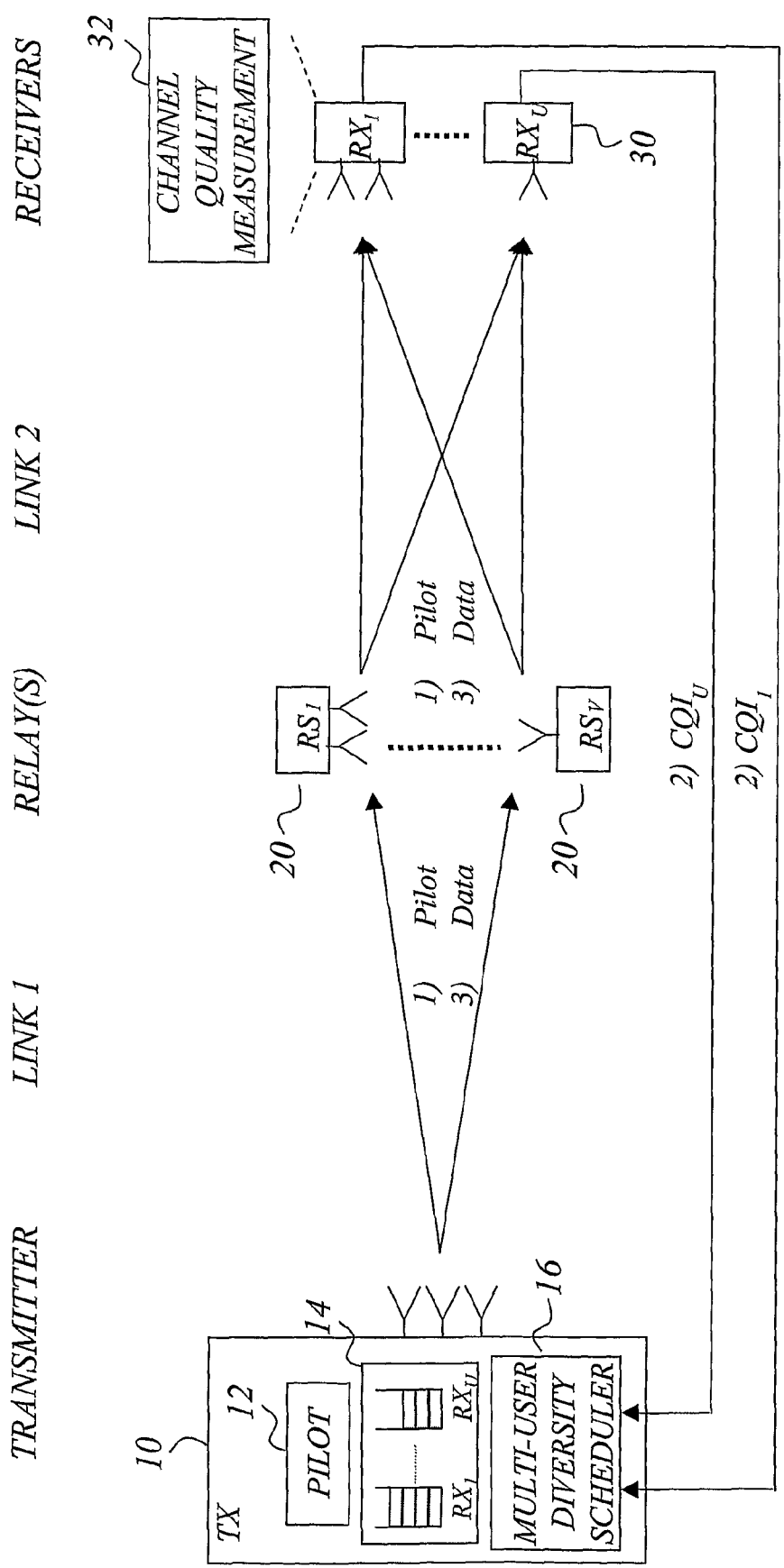
FIG. 9 is a schematic diagram of a MIMO/MISO-operated multi-user diversity based wireless cooperative relaying network according to an exemplary preferred embodiment of the invention.

FIG. 9 is a schematic diagram of a MIMO/MISO-operated multi-user diversity based wireless cooperative relaying network according to an exemplary preferred embodiment of the invention.

For the case when at least some of the originating transmitting node and the receiving nodes are equipped with multiple antennas and a MIMO/MISO-based opportunistic communication scheme is used, at least part of the relaying nodes may be equipped with one or multiple antennas, and one of the receiving nodes may be selected for MIMO/MISO based communication to create a richer channel, i.e. a channel that will increase the overall ETE channel capacity even further.

In particular, spatial multiplexing based MIMO may be used to offer high spectral efficiency. The feedback for this scheme is preferably a vector of channel qualities describing the quality of each MIMO sub-channel.

Multi-User MIMO/MISO Operation

For another case when the originating transmitting node is equipped with multiple antennas and the receiving nodes are equipped with at least one antenna, multiple receiving nodes may be selected and different spatially multiplexed information is directed and received by the selected receivers. In contrast to the previous case, where all MIMO/MISO sub-streams were spatially multiplexed and concurrently sent to one receiving node, here, MIMO and/or MISO sub-streams are spatially multiplexed and concurrently sent to different selected receiving nodes. The benefit of the latter scheme is even further enhanced performance as a greater degree of freedom is allowed by not restricting the selection to only one receiving node. The feedback for this scheme is preferably a vector of channel qualities describing the quality of each MIMO/MISO sub-channel.

Macro-Diversity Operated Wireless Network with Multi-User Diversity Scheduling

In another aspect of the invention, multi-user diversity is introduced for improving macro diversity in a wireless communication network in a unique way.

Figure 10:
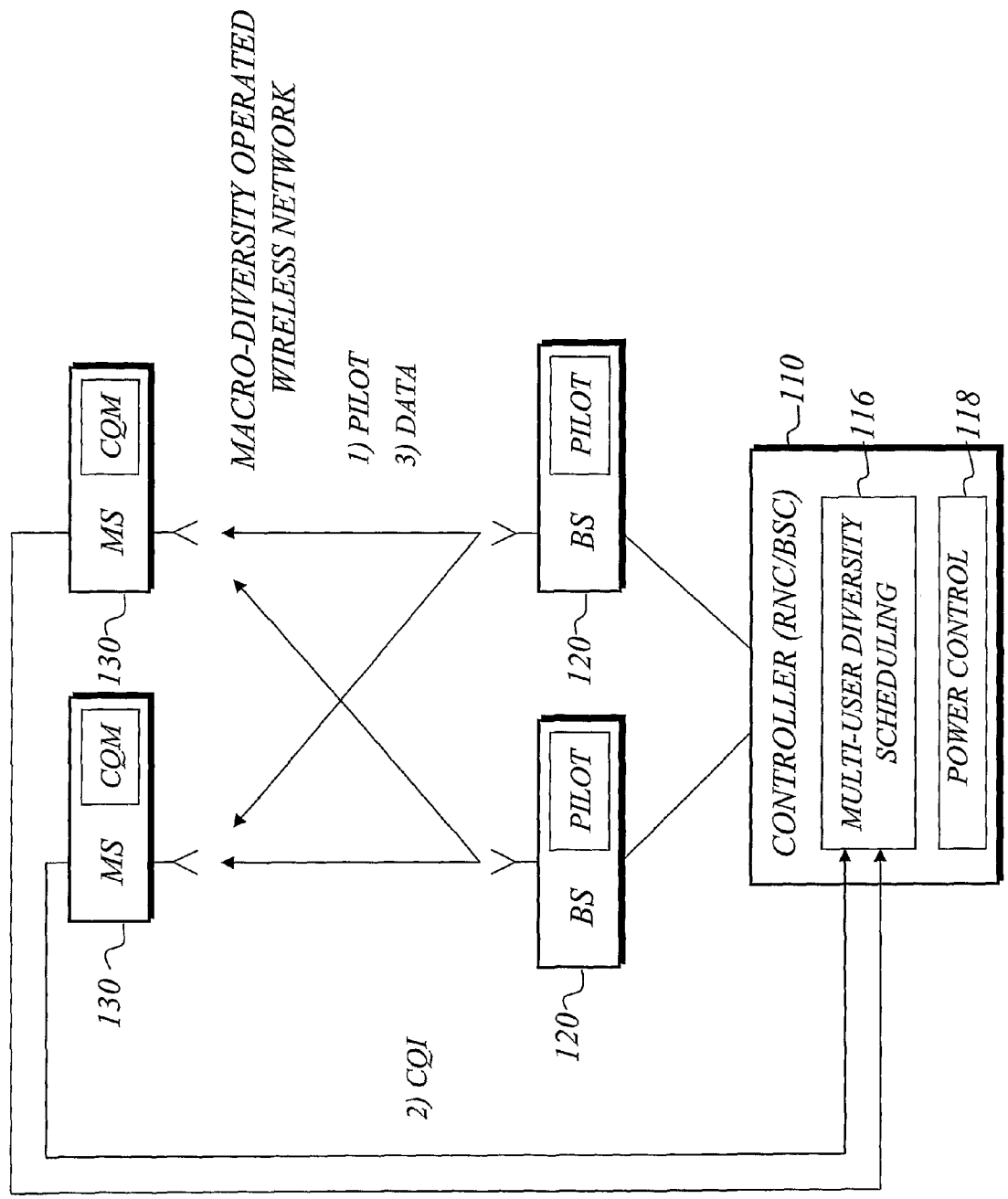
FIG. 10 is a schematic diagram of a macro-diversity operated wireless network employing multi-user diversity scheduling according to an exemplary preferred embodiment of the invention.

FIG. 10 is a schematic diagram of a macro-diversity operated wireless relaying network employing multi-user diversity scheduling according to an exemplary preferred embodiment of the invention. The wireless network basically comprises a controller 110, at least two base stations 120 in connection with the controller, and two or more mobile terminals 130. The base stations 120 concurrently transmit identical pilot signals, and each mobile terminal 130 receiving the pilot signal measures the channel quality in a dedicated channel quality measurement (CQM) module. Each mobile terminal 130 then feeds information on the measured channel quality all the way back to the controller 110, which includes a multi-user diversity scheduler 116 configured for scheduling data for transmission to one (or more) selected terminal(s) of the mobile terminals 130 based on received channel quality information (CQI). Finally data is transmitted to the selected mobile terminal through the base stations 120. The power control idea presented above is useful also in the macrodiversity application of FIG. 10, e.g. by using a control unit 118 for performing power control calculations and allocating transmit power to each of the considered base stations at least partly based on average link quality for the link between base stations and mobile terminals. The controller 110 may be a Radio Network Controller (RNC) or a Base Station Controller (BSC), and the controller 110 may for example be implemented in a separate network node, or alternatively integrated in a base station node.

The embodiments described above are merely given as examples, and it should be understood that the present invention is not limited thereto. Further modifications, changes and improvements that retain the basic underlying principles disclosed and claimed herein are within the scope of the invention.

REFERENCES

[1] J. N. Laneman, *Cooperative Diversity in Wireless Networks: Algorithms and Architectures*, Ph.D. Thesis, Massachusetts Institute of Technology, Cambridge, Mass., August 2002.
[2] International Patent Application with Publication No. WO 03/003672 A2, Dohler Mischa, Aghvami Abdol Hamid, Said Fatin, Ghorashi Seyed Ali, Jan. 9, 2003.
[3] Peter Larsson, "*Large-Scale Cooperative Relay Network with Optimal Coherent Combining under Aggregate Relay Power Constraints*", In proceedings of Future Telecommunications Conference (FTC2003), Beijing, China, Dec. 9-10, 2003.
[4] Peter Larsson, and Hu Rong, "*Large-Scale Cooperative Relay Network with Optimal Coherent Combining under Aggregate Relay Power Constraints*", In proceedings of Working Group 4, World Wireless Research Forum WWRF8 meeting, Beijing, Feb. 26-27, 2004.
[5] A. Wittneben, I. Hammerström, and M. Kuhn, "*Joint Cooperative Diversity and Scheduling in Low Mobility Wireless Networks*", IEEE Global Telecommunications Conference, Globecom 2004, November 2004.
[6] U.S. Patent Application Publication No. US 2004/0266339 A1, Peter Larsson, Dec. 30, 2004.
[7] U.S. Patent Application Publication No. US 2005/0014464 A1, Peter Larsson, Jan. 20, 2005.

The invention claimed is:

1. A method for relaying information in a wireless relaying network having a number of network nodes, said network comprising a designated originating node, at least one relaying node, and at least two receiving nodes, wherein said method comprises the steps of:
   said designated originating node transmitting a pilot signal;
   said at least one relaying node receiving and forwarding said pilot signal;
   each of said receiving nodes receiving said pilot signal and measuring channel quality based on the received pilot signal;
   at least part of said receiving nodes feeding back information on the measured channel quality all the way to said designated originating node;
   said designated originating node scheduling data for transmission by selecting at least one of said receiving nodes based on received channel quality information and selecting data associated with the selected receiving node(s) for transmission;
   said designated originating node transmitting a signal comprising said selected data and a cyclic prefix to the selected receiving node(s) via the same at least one relaying node that forwarded the pilot signal, wherein said network is based on OFDM (Orthogonal Frequency Division Multiplexing) or OFDMA (Orthogonal Frequency Division Multiple Access), and wherein said cyclic prefix is adapted to a power delay profile of an equivalent channel between the designated originating node and the selected receiving node(s) via the at least one relaying node,
   said at least one relaying node receiving the signal transmitted by said originating node, and with a latency substantially smaller than the OFDM symbol duration, transmitting the signal in the same frequency band, wherein the signal transmitted by the relaying node constructively interferes with the signal transmitted by the designated originating node when received by the selected receiving node(s).

2. The method of claim 1, wherein said wireless relaying network is a cooperative relaying network.

3. The method of claim 2, wherein said cooperative relaying network is a relay-assisted two-hop network.

4. The method of claim 1, wherein said at least one relaying node comprises at least two relaying nodes, for pilot transmission, concurrently and on the same frequency transmitting said pilot signal, and for data transmission, concurrently and on the same frequency transmit data.

5. The method of claim 4, further comprising the step of allocating, to each one of a number of selected relaying nodes, transmit power at least partly based on average link quality for the link between said relay nodes and a selected set of said receiving nodes.

6. The method of claim 5, wherein said step of allocating transmit power is also based on average link quality for the link between said originating node and said set of selected relaying nodes.

7. The method of claim 1, wherein said step of scheduling comprises:
   selecting receiving node(s) among those nodes that have the highest value of a channel quality based metric, and
   selecting data associated with the selected node(s) for transmission information.

8. The method of claim 1, wherein at least some of said originating node, said at least one relaying node and said receiving nodes have multiple antennas for improved communication operation.

9. The method of claim 8, wherein said originating node and at least one of said receiving nodes have multiple antennas for Multiple-Input Multiple-Output (MIMO)/Multiple-Input Single-Output (MISO) operation and said at least one relaying node each has at least one antenna, and one receiving node is selected for MIMO/MISO based communication.

10. The method of claim 9, wherein said MIMO operation is a spatial multiplexing based MIMO operation.

11. The method of claim 8, wherein said originating node have multiple antennas, and said receiving nodes and said at least one relaying node each have at least one antenna, and at least two receiving nodes are selected for concurrent spatial multiplexing based Multiple-Input Multiple-Output (MIMO) or Multiple-Input Single-Output (MISO) communication.

12. A system for relaying information in a wireless relaying network having a number of network nodes, said network comprising a designated originating node, at least one relaying node, and at least two receiving nodes, wherein said system comprises:
   means, in said designated originating node, for transmitting a pilot signal;

means, in said at least one relaying node, for receiving and forwarding said pilot signal;

means, in each of said receiving nodes, for receiving said pilot signal and for measuring channel quality based on the received pilot signal;

means, in at least part of said receiving nodes, for feeding back information on the measured channel quality all the way to said designated originating node;

means, in said designated originating node, for scheduling data for transmission by selecting at least one of said receiving nodes based on received channel quality information and selecting data associated with the selected receiving node(s) for transmission;

means, in said designated originating node, for transmitting a signal comprising said selected data and a cyclic prefix to the selected receiving node(s) via the same at least one relaying node that forwarded the pilot signal, wherein said network is based on OFDM (Orthogonal Frequency Division Multiplexing) or OFDMA (Orthogonal Frequency Division Multiple Access), and wherein said cyclic prefix is adapted to a power delay profile of an equivalent channel between the designated originating node and the selected receiving node(s) via the at least one relaying node, means, in said at least one relaying node, for receiving the signal transmitted by said originating node, and with a latency substantially smaller than the OFDM symbol duration, transmitting the signal in the same frequency band, such that the signal transmitted by the relaying node constructively interferes with the signal transmitted by the designated originating node when received by the selected receiving node(s).

13. The system of claim 12, wherein said wireless relaying network is a cooperative relaying network.

14. The system of claim 13, wherein said cooperative relaying network is a relay-assisted two-hop network.

15. The system of claim 12, wherein said at least one relaying node comprises at least two relaying nodes, for pilot transmission, concurrently and on the same frequency transmitting said pilot signal, and for data transmission, concurrently and on the same frequency transmitting data.

16. The system of claim 15, further comprising means for allocating, to each one of a number of selected relaying nodes, transmit power at least partly based on average link quality for the link between said relay nodes and a selected set of said receiving nodes.

17. The system of claim 16, wherein said means for allocating transmit power is also based on average link quality for the link between said originating node and said set of selected relaying nodes.

18. The system of claim 12, wherein said means for scheduling comprises:

means for selecting receiving node(s) among those nodes that have the highest value of channel quality; and means for selecting data associated with the selected node(s) for transmission.

19. The system of claim 12, wherein said at least one relaying node is an amplify-and-forward node.

20. The system of claim 12, wherein said at least one relaying node is a decode-and-forward node.

21. The system of claim 12, wherein said originating node is a base station and said receiving nodes are mobile terminals.

22. The system of claim 12, wherein at least some of said originating node, said at least one relaying node and said receiving nodes have multiple antennas for improved communication operation.

23. An apparatus for use in a relaying network, said apparatus comprising:

a transmitting module configured to transmit a pilot signal for the purpose of channel quality measurements in at least two receiving nodes, said pilot signal being received and forwarded to said receiving nodes by at least one relaying node;

a receiving module configured to receive channel quality information from said receiving nodes;

a multi-user diversity scheduler configured to schedule for data for transmission by selecting at least one of said receiving nodes based on said channel quality information obtained from said receiving nodes and to select data associated with the selected receiving node(s) for transmission;

a transmitting module configured to transmit a signal comprising said selected data and a cyclic prefix to the selected receiving node(s) via said at least one relaying node, wherein said transmitting module is configured to transmit in an OFDM—(Orthogonal Frequency Division Multiplexing) or OFDMA—(Orthogonal Frequency Division Multiple Access) based network, and wherein said cyclic prefix is adapted to a power delay profile of an equivalent channel between the apparatus and the selected receiving node(s) via said at least one relaying node.

24. The apparatus of claim 23, wherein said apparatus is implemented in a network node.

* * * * *

UNITED STATES PATENT AND TRADEMARK OFFICE
CERTIFICATE OF CORRECTION

PATENT NO. : 8,135,337 B2
APPLICATION NO. : 12/095478
DATED : March 13, 2012
INVENTOR(S) : Larsson It is certified that error appears in the above-identified patent and that said Letters Patent is hereby corrected as shown below:

On the Face Page, in Field (73), under "Assignee", in Column 1, Line 1,
delete "Ericsson," and insert -- Ericsson (publ), --, therefor.

In Column 6, Line 63, delete "s(in)" and insert -- s(n) --, therefor.

In Column 16, Line 27, in Claim 23, delete "schedule for" and insert -- schedule --, therefor.

Signed and Sealed this
Twelfth Day of June, 2012

David J. Kappos
*Director of the United States Patent and Trademark Office*